IP8212 OR 3,757,124

United States Patent [19]

Kaestner

[11] 3,757,124

[45] Sept. 4, 1973

[54] OPTICAL APPARATUS FOR FOCUSING AN IMAGE

[76] Inventor: Paul T. Kaestner, 246 Bay Ave., Huntington, N.Y. 11743

[22] Filed: Aug. 13, 1971

[21] Appl. No.: 171,551

[52] U.S. Cl. .................. 250/201, 95/44 R, 356/122
[51] Int. Cl. ........ G01j 1/00, G01j 1/20, G03b 3/00
[58] Field of Search .................... 250/201; 356/122; 95/44 R, 44 C

[56] References Cited

UNITED STATES PATENTS

| | | | |
|---|---|---|---|
| 3,554,650 | 1/1971 | Vyce | 356/122 X |
| 2,999,436 | 9/1961 | Faulhaber | 250/201 |

*Primary Examiner*—James W. Lawrence
*Assistant Examiner*—T. N. Grigsby
*Attorney*—Arthur Groeninger

[57] ABSTRACT

Apparatus for determining the optimum focus for an optical system including signal generating means, means responsive to the position of an element in the optical system upon which sharp focus depends for providing an output signal indicating the direction the element is displaced along the optical axis of the system from a point of optimum focus. The ouput signal can be used as a servo error signal to automatically reposition the element to a position of optimum focus or, in the alternative, the element can be manually repositioned until the output signal is driven to null.

9 Claims, 16 Drawing Figures

FIG. 1
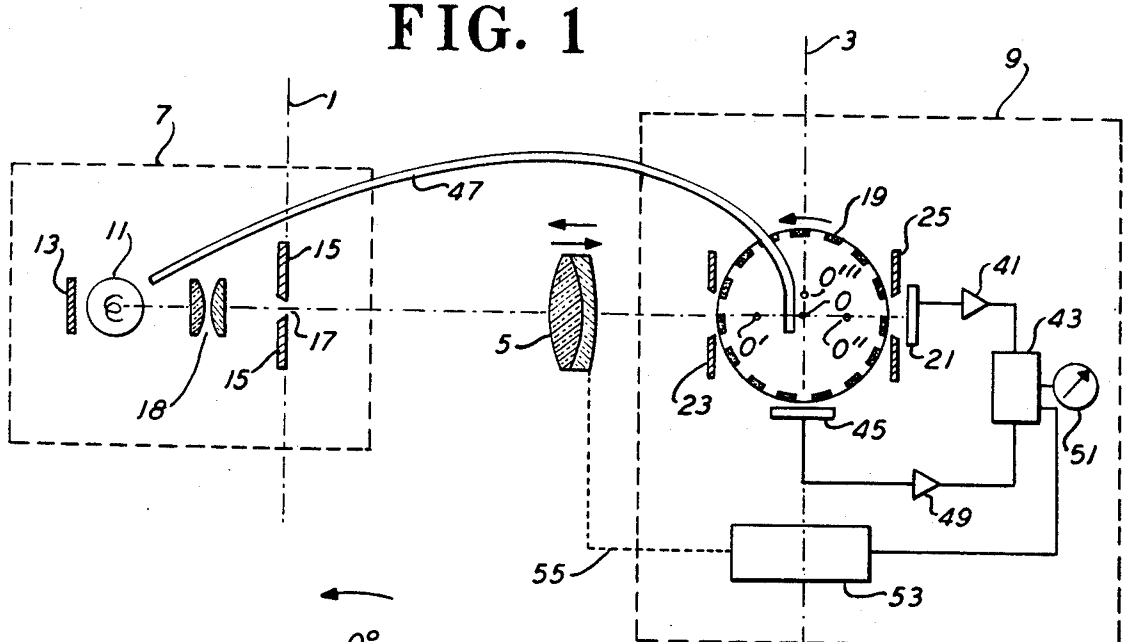
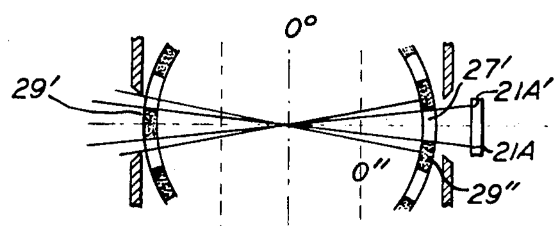
FIG. 3A
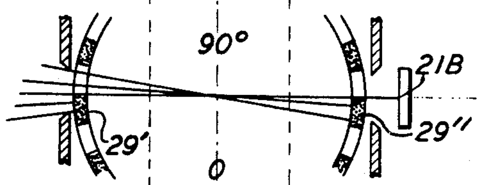
FIG. 3B
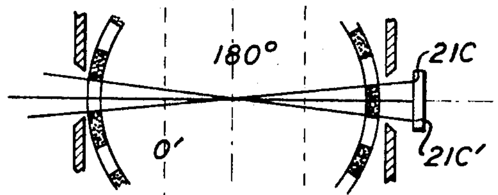
FIG. 3C
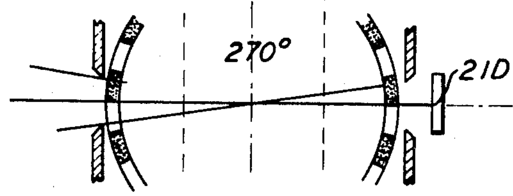
FIG. 3D
INVENTOR.
PAUL T. KAESTNER
BY
ATTORNEY

INVENTOR.
PAUL T. KAESTNER

BY

ATTORNEY

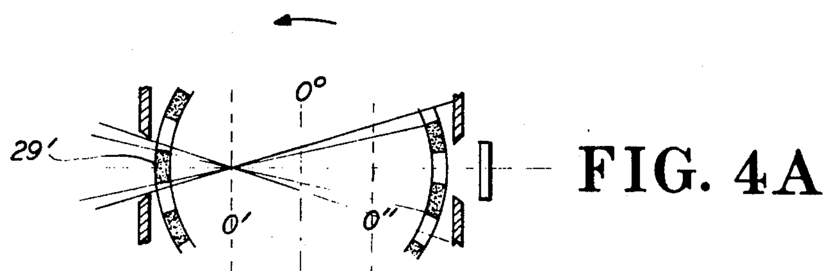
FIG. 4A
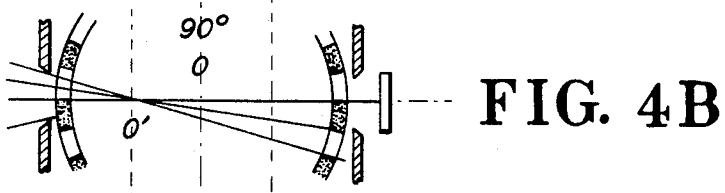
FIG. 4B
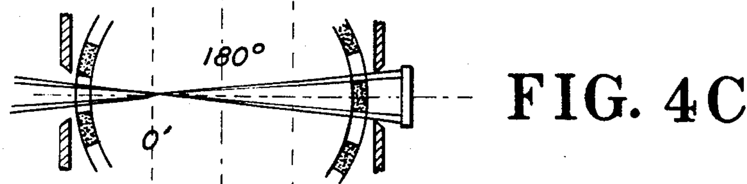
FIG. 4C
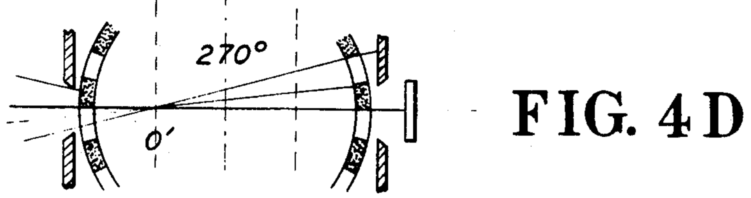
FIG. 4D
FIG. 5
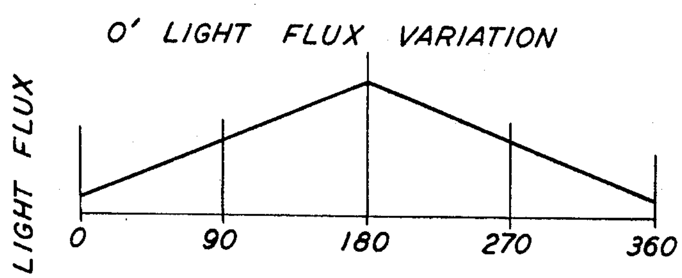
INVENTOR.
PAUL T. KAESTNER
BY
ATTORNEY

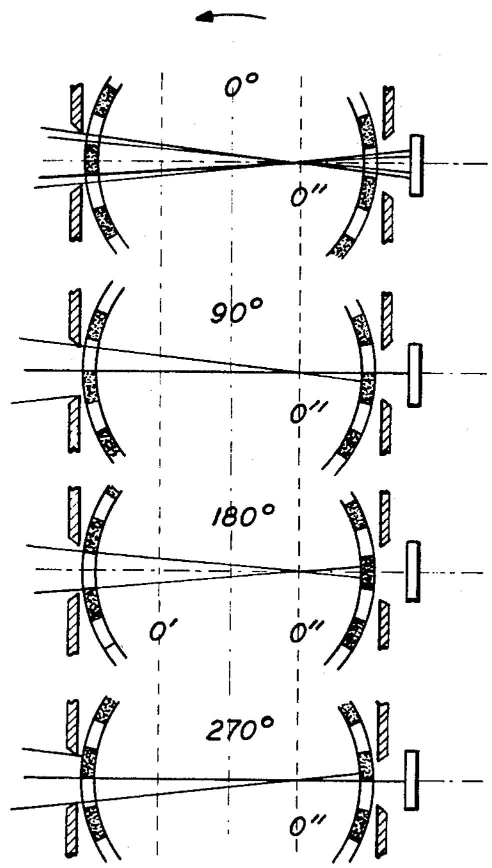
FIG. 6A
FIG. 6B
FIG. 6C
FIG. 6D
FIG. 7
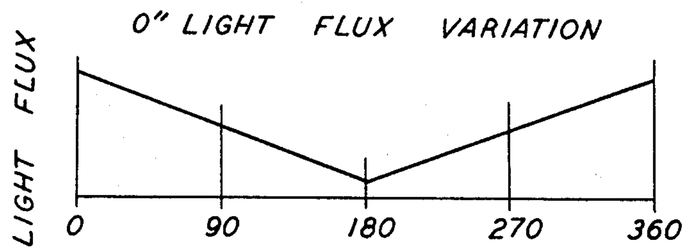
INVENTOR.
PAUL T. KAESTNER
BY
ATTORNEY

OPTICAL APPARATUS FOR FOCUSING AN IMAGE

BACKGROUND OF THE INVENTION

Determining optimum focus for an optical system has always been a particularly difficult task. Conventional practice has been to establish optimum focus visually.

When a condition of optimum focus in the image plane is determined by human eye, there is a constant problem of doubtful accuracy and poor repeatability. Moreover, visual focusing is a time consuming process.

Only one commercial system is known wherein the place of sharpest focus is determined without depending directly on the human eye. This system is described on pages 18–22, of the May/June 1968 issue of OPTICAL SPECTRA wherein a light sensing probe is placed in the image plane of an optical system. The probe has an output to a recorder or the like. An element of the system is adjusted until the output of the probe is at maximum indicating maximum sharpness.

The Problems with this system are:

1. it is subject to drift and needs constant calibration
2. it does not provide indication of the sense of the error
3. its application is limited by slow response

BRIEF DESCRIPTION OF THE PRESENT INVENTION

The present invention includes a signal generating system including a photo sensor for converting light passing through a rotating cylindrical chopper into an electric signal. When the image of an illuminated slit is produced coaxial with the chopper, a uniform light flux is produced on the photosensor. In this condition, the signal generating means produces a null. Shift of the slit image from the center of the chopper produces a fluctuating light flux at the sensor having a phase characteristic which depends on whether the image is fore or aft of the chopper center.

In response to the fluctuating light, a signal is produced having a phase corresponding to whether the image is fore or aft of the center of the chopper. This signal is compared with a reference signal producing an output signal indicating the direction for corrective action. The output signal can be used as an error signal for servo control of lens, mirror or other element in an optical system which controls the plane of focus of the slit image. A high frequency output signal can be produced by rotating the chopper at high speed thereby allowing high frequency input to the servo system to speed up response.

By locating the central axis of the chopper in a desired image plane of an optical system, the present invention can be used to properly locate an element of the optical system to a position providing optimum focus.

DESCRIPTION OF THE DRAWINGS

FIG. 1 is schematic plan diagram of the present invention.

FIGS. 3A, 3B, 3C and 3D show the chopper in successive rotational positions with light passing through the chopper when the light image is focused at the center of the chopper.

FIGS. 4A, 4B, 4C and 4D are views similar to FIGS. 3A, 3B, 3C and 3D except that the image is focused short of the center of the chopper.

FIG. 5 is graph illustrating the variation in light flux through one of the repeated light flux patterns generated when the light image is positioned as in the FIG. 4 series.

FIGS. 6A, 6B, 6C and 6D are also views similar to FIGS. 3A, 3B, 3C and 3D except that the image is foucused aft of the center of the chopper.

FIG. 7 is a graph similar to graph of FIG. 5 of light flux variation, except that it shows a phase shift of 180° due to the light image appearing aft of center as in FIG. 6 series.

DETAILED DESCRIPTION IN GENERAL

Figure 2:
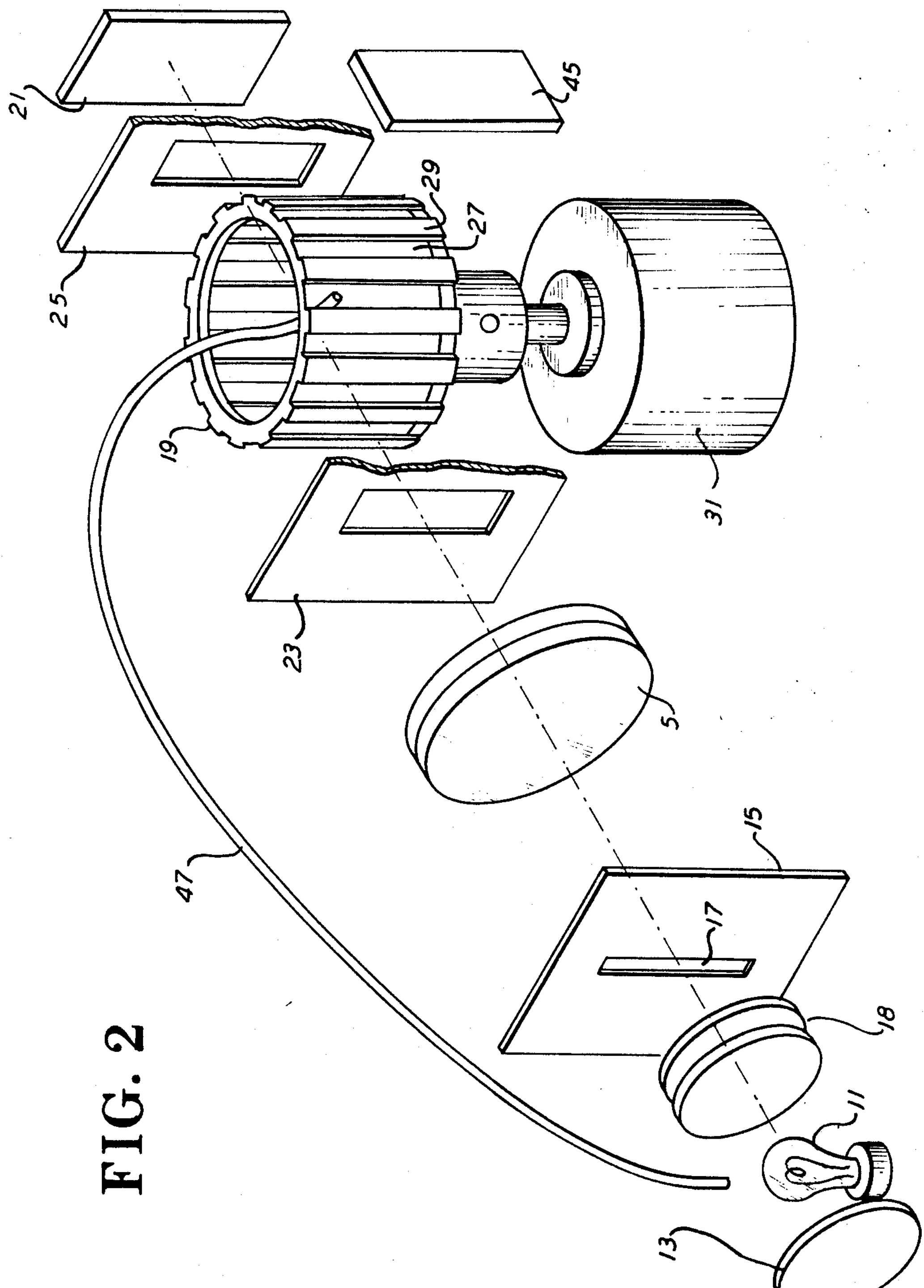
FIG. 2 comprises perspective views of components of the system interconnected schematically.

Referring to FIG. 1, the invention is illustrated as applied to an optical system including an object plane 1, a target image plane 3, and a lens 5. Lens 5 is to be positioned intermediate to planes 1 and 3 so as to focus an object in object plane 1 in the image plane 3.

In order to properly position lens 5, the present invention includes a transmitter 7 and a receiver 9 which are located in fixed positions relative to the known object and image planes 1 and 3.

Transmitter 7 includes a light source 11, a reflector 13 for the light source, and light shield 15 defining a slit 17. A condensing lens 18 concentrates light from source 11 on to slit 17. The light shield 15 is aligned with the known object plane of the optical system.

Receiver 9 includes a rotary chopper 19 and photoelectric sensor 21. Axis 0 of chopper 19 lies in the known image plane 3 of the optical system being focused. When lens 5 is properly adjusted, a slit image of the illuminated slit 17 should be at 0 in image plane 3.

As hereinafter more particularly described, when the slit image lies in image plane 3, a flux of negligible magnitude is received by sensor 21 and a null signal is produced by a signal generating system, hereinafter described, thereby indicating that lens 5 is properly positioned. When the slit image lies fore or aft of the central axis 0, e.g. at 0′ and 0″, then sensor 21 detects a fluctuating light flux with a 180° phase shift corresponding to whether the slit image is fore or aft the center 0 of chopper 19.

Light shields 23 and 25 are provided for limiting the angles of convergence to and divergence from the slit image at the center of the chopper 19.

Referring to FIG. 2, chopper 19 comprises a tubular member having a plurality of slots 27 and bars 29, odd in number and extending along the height thereof. As hereinafter explained, the odd number of slots 27 and bars 29 produce the phase shift hereinbefore referred to. Each bar 29 is diametrically opposite a slot 27. The bars 29 are of uniform width and slots 27 are of uniform width. As illustrated, width of slots 27 equal the width of bars 29 but this is not a requirement.

While not illustrated, the chopper 19 can be made with an even number of slots but, in this instance, the central axis 0 of the chopper would have to be displaced from the optical axis, as e.g. at 0‴ (See FIG. 1). Since this arrangement substantially adds to the complexity of the system, it is not considered to be the preferred embodiment of the invention.

Again referring to FIG. 2, chopper 19 is adapted to be rotated by any conventional drive means 31 at a uniform speed. The speed will govern frequency of the pickup by sensor 21 enabling a high frequency input to speed-up response of a servo control.

As hereinbefore described, the output of sensor 21 is phase shifted 180° depending on whether the slit image is located fore, e.g. 0', or aft, e.g. 0'', of the center 0 of the chopper 19. When the slit image is aligned with axis 0 of chopper 19 in image plane 3, a flux of negligible magnitude is received by chopper 19.

In order to illustrate the foregoing phase shift, FIGS. 3, 4, and 6 illustrate a succession of rotational positions of chopper 19. An angular rotation equivalent to the angular width of one slot and one bar is one cycle of the repeating light flux pattern or one 360° cycle of the repeating output signal from sensor 21.

FIGS. 3A, 3B, 3C and 3D illustrate that light flux of negligible magnitude is received by sensor 21 as the chopper rotates through one cycle when the image is properly focused at 0 in image plane 3.

FIG. 3A shows a condition wherein a bar 29' is centered on the optical axis on the input side of chopper. With an odd number of slots, this positions a slot 27' on the opposite side also centered on the optical axis. With the input and output so limited, only two single light rays of negligible magnitude are received at two locations as indicated at 21A and 21'. In FIG. 3B, the chopper 19 has rotated counter-clockwise one-half a bar width so that the sidewall of bar 29' is aligned with the optical axis. With the input and output so limited, a single light ray is received at 21B. Accordingly, the output of light is as negligible in FIG. 3B as it was in FIG. 3A. In FIG. 3C, the chopper is again rotated one-half a bar width to produce two single light rays at 21C and 21C'. In FIG. 3D, the chopper has again rotated one-half of a bar width. A single ray of light is received at 21D.

Referring now to FIGS. 4 and 5, light flux impinging on sensor 21 is illustrated when the image is focused in an image plane 0', short of the center 0 of the chopper. In this showing, the chopper goes through the same rotational movements illustrated in the FIG. 3 series.

As illustrated in FIG. 4A, the input bar 29' so limits the light passing through the chopper that no light impinges on sensor 21. In FIG. 4B, only a single ray of light impinges on the sensor 21. In FIG. 4C, substantial light impinges on the sensor 21 to provide an output signal. In FIG. 4D, a single ray of light is received by sensor 21, as in FIG. 4B so as to provide a negligible output.

FIG. 5 is a plot of the light flux variation for an image of 0' as a function of chopper angular positions illustrated in FIGS. 4A, 4B, 4C and 4D. Theoretically, no light passes through the chopper in the 0°–90° range and in the 270°–360° range. This is based on the assumption that the slit image has no width. In fact, it does have some finite width which causes a light flux variation having minimum values at 0° and 360°, as illustrated in FIG. 5.

Referring to FIG. 6 and 7, the light flux impinging on sensor 21 is illustrated when the image is focused in image plane 0'', beyond the center 0 of the chopper while the chopper goes through the same rotational movements illustrated in FIG. 3.

As illustrated, only in FIG. 6A does sensor 21 receive substantial light through the chopper 19.

FIG. 7 is a plot of the light flux variation for an image at 0'' as a function of chopper angular positions illustrated in FIGS. 6A, 6B, 6C and 6D. By comparing FIGS. 5 and 7, it will be noted that a 180° phase shift in output occurs dependent on whether the image focuses short of or beyond 0. Theoretically, in FIGS. 6A, 6B, 6C and 6D, no light passes through the chopper between the 90°–270° positions. This again is based on the assumption that the slit image has no width. In fact, it does have some finite width which causes light flux variation having minimum value at 180°, as illustrated in FIG. 7.

SIGNAL GENERATING SYSTEM

Again referring to FIG. 1, the output from sensor 21 is amplified at 41 and sent to a phase sensitive detector at 43. Here the signal is compared with a fixed phase reference signal.

The phase sensitive detector is conventional and may be of the type described in "Theory of Servomechanisms", pages 111–114, by Nicholls et. al., published by McGraw-Hill, 1947.

Detector 43 has a second input for receiving the reference signal. The reference signal is the output from a sensor 45 which is amplified at 49. Sensor 45 receives light through one side of chopper 19. The light impinging on sensor 45 is generated by source 11 and fed by fiber optics 47 into the chopper as shown in FIG. 2.

By receiving light through the chopper 19, the output from sensor 45 provides a reference signal having the same frequency as the output from sensor 21.

Detector 43 compares the outputs from sensors 21 and 45 and provides an output signal having a magnitude and polarity corresponding to the distance and direction the slit image is offset from image plane 3. This signal is fed to an indicator 51 to indicate the direction for corrective action. In the alternative and in addition, the signal may be fed to a servo control 53, and by suitable mechanical linkage 55, the lens 5 can automatically be repositioned. Alternatively, the transmitter 7 or receiver 9 may be repositioned to achieve null signal condition.

While one embodiment of the present invention has been shown and described, it is to be understood that variations as may occur to a skilled mechanic in the art may be made within the scope of the invention.

What is claimed is:

1. The combination comprising optical means for focusing an image and means for providing an output signal indi-cating the direction said optical means is displaced from a point of optimum focus, said last mentioned means comprising a rotatable chopper for providing a repeated fluctuating light flux pattern having a phase corresponding to the direction said optical means is displaced from said predetermined point of optimum focus, said chopper comprising a hollow cylindrical member having a number of slots and bars on the side wall thereof.

2. The combination as defined by claim 1, means responsive to the output signal for repositioning said optical means to a point of optimum focus.

3. The combination as defined by claim 1, said last mentioned means comprising means for providing a variable out-put signal depending on the position of said optical means, means for providing a fixed reference signal stabilized with respect to the remainder of said last mentioned means so as to not require constant calibration, means for comparing said reference and variable signals to provide said output signal.

4. The combination as defined by claim 1 wherein said number of slots and bars is odd.

5. The combination comprising a light transmitter optical means for focusing an image and means for providing an output signal indicating a characteristic or position of the optical means, said signal comprising a repeating fluctuating light flux pattern having a phase corresponding to the difference between said characteristic or position and a desired character-istic or position, said image passing through said means for providing an output signal twice in forming said signal.

6. The combination as defined by claim 5, means responsive to the output signal for repositioning said optical means to a point of optimum focus.

7. The combination as defined by claim 5 said last mentioned means comprising means for providing a variable output signal depending on the position of said optical means, means for providing a fixed reference signal stabilized with respect to the remainder of said last mentioned means so as to not require constant calibration, means for comparing said reference and variable signals to provide said output signal.

8. The combination of claim 5, said means for providing an output signal comprising grating means mounted to intersect said image fore and aft of a desired focal point.

9. The combination of claim 8, said grating means comprising a light receiver and wherein said light receiver is located in a predetermined position with respect to the light transmitter and to the known target image planes of the optical system.

* * * * *

UNITED STATES PATENT OFFICE
CERTIFICATE OF CORRECTION

Patent No. 3,757,124 Dated September 4, 1973

Inventor(s) Paul T. Kaestner

It is certified that error appears in the above-identified patent and that said Letters Patent are hereby corrected as shown below:

In the specification:

Column 1, line 13 "place" should read -plane-.

Column 2, line 10 "foucused" should read -focused-

Column 2, line 48, between "center" and "of" 0 should be inserted.

Column 3, line 25, "21'" should read -21A'-.

In the claims:

Claim 1, line 48, column 4, "indi-cating" should read -indicating-.

Claim 5, line 9, column 5, "character-istic" should read -characteristic-

Signed and sealed this 13th day of August 1974.

(SEAL)
Attest:

McCOY M. GIBSON, JR.
Attesting Officer

C. MARSHALL DANN
Commissioner of Patents